(12) United States Patent
Simon et al.

(10) Patent No.: US 11,196,124 B2
(45) Date of Patent: Dec. 7, 2021

(54) BATTERY FOR A MOTOR VEHICLE AND MOTOR VEHICLE

(71) Applicant: AUDI AG, Ingolstadt (DE)

(72) Inventors: Martin Simon, Ingolstadt (DE); Markus Thurmeier, Adlkofen (DE)

(73) Assignee: AUDI AG, Ingolstadt (DE)

( * ) Notice: Subject to any disclaimer, the term of this patent is extended or adjusted under 35 U.S.C. 154(b) by 108 days.

(21) Appl. No.: 16/488,733

(22) PCT Filed: Feb. 20, 2018

(86) PCT No.: PCT/EP2018/054168
§ 371 (c)(1),
(2) Date: Aug. 26, 2019

(87) PCT Pub. No.: WO2018/166762
PCT Pub. Date: Sep. 20, 2018

(65) Prior Publication Data
US 2021/0135313 A1 May 6, 2021

(30) Foreign Application Priority Data
Mar. 16, 2017 (DE) ...................... 10 2017 204 412.8

(51) Int. Cl.
| | |
|---|---|
| *H01M 10/625* | (2014.01) |
| *H01M 10/6556* | (2014.01) |
| *H01M 50/209* | (2021.01) |
| *H01M 50/249* | (2021.01) |
| *H01M 50/244* | (2021.01) |
| *H01M 10/613* | (2014.01) |
| *H01M 10/653* | (2014.01) |
| *B60L 50/64* | (2019.01) |
| *H01M 50/293* | (2021.01) |

(52) U.S. Cl.
CPC ........... *H01M 50/244* (2021.01); *B60L 50/64* (2019.02); *H01M 10/613* (2015.04); *H01M 10/625* (2015.04); *H01M 10/653* (2015.04); *H01M 10/6556* (2015.04); *H01M 50/209* (2021.01); *H01M 50/249* (2021.01); *H01M 50/293* (2021.01); *H01M 2220/20* (2013.01)

(58) Field of Classification Search
CPC ........... H01M 50/244; H01M 10/6556; H01M 10/625; H01M 10/653; H01M 50/209; H01M 50/249; H01M 50/293; H01M 10/613; H01M 2220/20; B60L 50/64
See application file for complete search history.

(56) References Cited

U.S. PATENT DOCUMENTS

| | | | | |
|---|---|---|---|---|
| 6,517,967 B1* | 2/2003 | Shrim | ................. | H01M 8/0228 |
| | | | | 429/148 |
| 2015/0255837 A1* | 9/2015 | Larsson | ............ | H01M 10/0481 |
| | | | | 429/120 |
| 2017/0244082 A1* | 8/2017 | Ahn | ....................... | H01M 50/10 |
| 2017/0346143 A1* | 11/2017 | Deser | ................ | H01M 10/6554 |
| 2017/0365887 A1* | 12/2017 | Kwon | ............... | H01M 10/4207 |
| 2018/0034117 A1* | 2/2018 | Bang | ................... | H01M 10/613 |
| 2019/0393574 A1* | 12/2019 | Goeb | .................. | C08K 5/0016 |

FOREIGN PATENT DOCUMENTS

| | | |
|---|---|---|
| CN | 101626089 A | 1/2010 |
| CN | 101772857 A | 7/2010 |
| CN | 101820050 A | 9/2010 |
| CN | 102005601 A | 4/2011 |
| CN | 103168387 A | 6/2013 |
| CN | 103283074 A | 9/2013 |
| CN | 103959538 A | 7/2014 |
| CN | 104681750 A | 6/2015 |
| CN | 204538144 U | 8/2015 |
| CN | 104884288 A | 9/2015 |
| CN | 104900822 A | 9/2015 |
| CN | 105377603 A | 3/2016 |
| CN | 105493339 A | 4/2016 |
| CN | 106450119 A | 2/2017 |
| DE | 102009040128 A1 | 3/2011 |
| DE | 102011082562 A1 | 3/2013 |
| DE | 102013224738 A1 | 6/2015 |
| DE | 102014018746 A1 | 6/2016 |
| DE | 102014225845 A1 | 6/2016 |
| DE | 102015203997 A1 | 9/2016 |
| EP | 2683002 A2 | 1/2014 |
| EP | 2910394 A1 | 8/2015 |

(Continued)

OTHER PUBLICATIONS

International Preliminary Report on Patentability (Chapter II) dated Sep. 19, 2019, in corresponding International application No. PCT/EP2018/054168; 5 pages.
German Examination Report dated Nov. 30, 2017 in corresponding German Application No. 10 2017 204 412.8; 12 pages.
International Search Report and Written Opinion dated May 30, 2018 in corresponding International Application No. PCT/EP2018/054168; 24 pages.
Written Opinion dated Mar. 13, 2019 in corresponding International Application No. PCT/EP2018/054168; 10 pages.

(Continued)

*Primary Examiner* — Muhammad S Siddiquee
(74) *Attorney, Agent, or Firm* — Maier & Maier, PLLC (57) ABSTRACT

A battery for a motor vehicle, having at least one battery module which comprises a plurality of battery cells, and having a battery housing in which the at least one battery module is disposed. A gap filler is disposed in an intermediate space between a wall of the battery housing and a wall of a module housing of the battery module. The intermediate space is limited towards at least one side by at least one limiting member, which is spaced apart from at least one other wall adjacent to the wall of the battery housing. Furthermore, the disclosure relates to a motor vehicle having at least one such a battery.

9 Claims, 5 Drawing Sheets

(56) References Cited

FOREIGN PATENT DOCUMENTS

| WO | 00/36688 A1 | 6/2000 |
| WO | 2016/133360 A1 | 8/2016 |

OTHER PUBLICATIONS

Chinese Office Action dated Aug. 13, 2021, in connection with corresponding CN Application No. 201880017500.2 (17 pp., including machine-generated English translation).

* cited by examiner

BATTERY FOR A MOTOR VEHICLE AND MOTOR VEHICLE

FIELD

The invention relates to a battery for a motor vehicle, having at least one battery module which comprises a plurality of battery cells, and having a battery housing in which the at least one battery module is disposed, Furthermore, the invention relates to a motor vehicle having such a battery.

BACKGROUND

DE 10 2009 040 128 A1 describes a battery pack having a multitude of elongate shaped battery cells, which stand upside down in a pan. The heads of the battery cells are positioned on the top side of an elastic mat, which has holes. A casting compound fills the holes of the mat. The casting compound also covers a portion of the longitudinal sides of the battery cells which abut with the heads of the battery cells. The cured casting compound is to prevent the battery cells from vibrating if the battery pack is subjected to vibrations.

It is a disadvantage in this context that introducing the casting compound into the battery pack results in a relatively heavy weight of the battery pack.

Furthermore, it is known from the battery manufacturing practiced by the applicant that a battery module is disposed in a compartment defined by walls, which is limited on the bottom side by a bottom of a battery housing. First, a gap filler is disposed in the compartment, which is to improve heat dissipation from the battery cells of the battery module towards a cooling means of the battery. The gap filler, which is substantially applied in strips to the bottom of the compartment, is flattened when the battery module is fastened to the battery housing.

Due to the closed system, it is difficult to ensure that the gap filler fills an intermediate space between a bottom of the battery module and the bottom of the battery housing as completely as possible. With respect to heat dissipation from the battery cells of the battery module, the bottom of a module housing of the battery module should be wetted as completely as possible with the gap filler.

To ensure the required gap filling, an excess of the gap filler can be inserted in the compartment. But then the gap filler will exit laterally in an undefined manner from the intermediate space between the bottom of the module housing and the bottom of the battery housing. This results in waste of gap filler and furthermore in a weight increase of the battery or the motor vehicle, respectively, if the battery is installed in the motor vehicle.

Furthermore, it is difficult to ensure a uniform distribution of the gap filler in the intermediate space. This is because the bottom of the battery housing may have irregularities, or the bottom of the battery housing may be warped.

SUMMARY

It is therefore the problem of the present invention to achieve particularly far-reaching wetting of a wall of a module housing of the battery module with a gap filler while keeping the battery weight low, and to provide a motor vehicle having at least one such battery.

The battery according to the invention for a motor vehicle includes at least one battery module, which comprises a plurality of battery cells. The at least one battery module is disposed in a battery housing of the battery. A gap filler is disposed in an intermediate space between a wall of the battery housing and a wall of the module housing of the battery module. The intermediate space is limited at least towards one side by at least one limiting member. The at least one limiting member is spaced apart from at least one other wall which abuts with the wall of the battery housing. Accordingly, the at least one limiting member is used as a flow blocker for the gap filler, when the gap filler is laterally displaced due to disposing the battery module on the battery housing. By providing at least one, preferably line-shaped, limiting member, the gap filler is prevented from undesired lateral exit from the intermediate space and particularly from reaching the at least one other wall.

Furthermore, the limiting member can influence the flow path of the gap filler such that particularly far-reaching, particularly complete, wetting of the wall of the module housing of the battery module by the gap filler is achieved. Nevertheless, there is no need to add an overdose or excess of gap filler. In addition, less gap filler is required. This results in cost savings of battery manufacturing and a weight reduction of the battery.

In addition, the at least one limiting member can ensure that the intermediate space is filled with gap filler without air inclusions. This again makes it possible to achieve efficient dissipation of heat from the battery cells of the battery module through the gap filler. Accordingly, improved cooling of the battery cells of the battery module can be achieved.

In addition, there is no need to precisely measure the wall of the battery housing prior to applying the gap filler and to take the results of measurement into account when applying the gap filler. The effort involved with these activities can thus be avoided. Instead, the gap filler can be applied, particularly to the wall of the battery housing, regardless of the respective finish of the wall of the battery housing in the region of the at least one battery module, for example regardless of any warping of the wall of the battery housing. This allows particularly fast manufacturing of the battery with very little effort.

A space between the at least one limiting member and the at least one other wall of the battery housing is preferably substantially free of gap filler. Accordingly, the gap filler is preferably located only in the intermediate space between the wall of the module housing and the wall of the battery housing. But the gap filler does not reach, particularly not continuously reach, the at least one other wall. This is prevented by the at least one limiting member.

It is preferred that the intermediate space is circumferentially limited by the at least one limiting member. This can prevent undesired, undefined exiting of gap filler from out of the intermediate space particularly well. For example, multiple limiting members used as flow blockers may define the circumference of the intermediate space.

It has also proved advantageous that a passage is formed between at least two limiting members, which passage allows a portion of the gap filler to exit from the intermediate space. This can particularly easily ensure that the gap filler fills the intermediate space without air inclusions. This again ensures improved heat conduction through the gap filler. In addition, defined exit of a (very small) portion of gap filler from the intermediate space and through the passage Level monitoring can also be easily implemented by providing the at least one passage between the at least two limiting members.

This is particularly true if the wall of the module housing has the shape of a rectangle, wherein the respective passages are formed between limiting members disposed on long sides of the rectangle and limiting members disposed on short sides of the rectangle. Such passages provided on the corners of the rectangle can provide defined exit sites for monitoring the level of gap filler in the intermediate space. If the wall of the module housing has a rectangular shape, the flow path of the gap filler to all four corners of the rectangle is the longest. If passages between the limiting members are provided on all four corners of the rectangle, exiting gap filler from all passages allows the conclusion that the intermediate space is completely filled with the gap filler. Thus wetting the entire surface area of the wall of the module housing with the gap filler is ensured.

The at least one limiting member may be disposed on the wall of the battery housing. But then the tolerances of the module housing can be less easily taken into account.

Therefore, the at least one limiting member is preferably fastened to the wall of the module housing. This makes it easy, for example, to take manufacturing tolerances of the module housing into account when attaching the at least one limiting member to the wall of the module housing. This also helps achieve far-reaching or complete filling of the intermediate space with the gap filler.

Particularly, the at least one limiting member may be fastened to an edge of the wall of the module housing. For example, multiple limiting members may be attached by gluing to the edges of the module housing in such a manner that the limiting members surround the intermediate space like a frame. Thus the limiting members provide a particularly effective flow blocker.

It has further proved advantageous that the at least one limiting member is formed of an air permeable material. For example, a material of the type of a, particularly coarse-pored, cellular rubber or of such an open-pored foam material can be used.

This helps ensure that air can also escape through the limiting member when the gap filler increasingly fills the intermediate space. Accordingly, air permeability or breathability of the material of which the at least one limiting member is formed also helps prevent air inclusions in the intermediate space.

It is further advantageous that the at least one limiting member is formed of a compressible material. On the one hand, this helps compensate for tolerances. On the other hand, the at least one limiting member already functions as a flow blocker in its non-compressed state. Furthermore, the height of the compressed material can be used to easily and reliably set a desired height of the intermediate space.

Preferably, the at least one limiting member has a greater height in an initial state than in an installed state, in which the battery module is fastened to the battery housing. The module housing may be pressed against the battery housing, particularly by tightening screws or similar fastening elements. For example, the at least one limiting member may have a height of about 4 mm to 5 mm in the non-compressed state and a height of about 1 mm to about 2 mm, particularly about 1.5 mm, in the compressed installed state.

Preferably, the gap filler includes a plastic material and at least one additive, wherein the additive has a higher heat conductivity than the plastic material. For example, particles of aluminum oxide and/or graphite can provide the gap filler with improved heat conductivity. This ensures good heat conductivity when dissipating heat through the gap filler.

It has further proved advantageous that a cooling means through which a cooling medium can flow is disposed on a side of the wall of the battery housing facing away from the battery module. For example, cooling medium lines formed as extruded profiles may provide the cooling means through which particularly a cooling liquid can flow to dissipate heat from the battery cells. However, the cooling medium or temperature-control medium can also be used to introduce heat into the battery cells, for example to rapidly bring the battery cells to a desired operating temperature.

Good heat dissipation from the battery cells can be achieved by disposing the cooling means on the side of the battery housing facing away from the battery module. This applies particularly when the cooling means is fastened to the side of the wall of the battery housing facing away from the battery module by means of a preferably heat conductive adhesive.

Preferably, the battery comprises a plurality of battery modules, wherein the wall of the battery housing is formed as the bottom of the battery housing. A plurality of other walls in abutment with the bottom of the battery housing form compartments in which the battery modules are received. In this manner, the gap filler can ensure good heat dissipation from the battery modules disposed in the respective compartments or chambers.

The battery cells disposed in the module housing of the battery module may particularly be configured as lithium ion cells, which comprise a respective cell housing. The battery cells in the battery module are electrically interconnected via electric ports or poles conducted out of the respective cell housings.

The battery is preferably configured as a high-voltage battery, which comprises a plurality of battery modules. Such a high-voltage battery, which provides a nominal voltage of more than 60 volts, for example a nominal voltage of about 300 volts to about 600 volts, can be used particularly well as an electric power storage device for the motor vehicle, for example when the motor vehicle is configured as an electric vehicle or as a hybrid vehicle.

The motor vehicle according to the invention includes at least one battery according to the invention. Preferably, electric power for a drive unit of the motor vehicle configured for moving the motor vehicle can be provided by means of the battery.

The invention also includes further developments of the motor vehicle, which have features already described in conjunction with further developments of the battery. For this reason, the respective further developments of the motor vehicle are not described once again herein.

BRIEF DESCRIPTION OF THE FIGURES

An exemplary embodiment of the invention is described below. Wherein.

DETAILED DESCRIPTION

The exemplary embodiment explained below is a preferred embodiment of the invention. In this exemplary embodiment, the components of the embodiment described each represent individual features of the invention which are to be considered independently, which features also separately develop the invention further and should therefore be considered a part of the invention, both by themselves and in another combination than the combination shown. Furthermore, the embodiment described can be supplemented by other features of the features of the invention already described.

Figure 1:
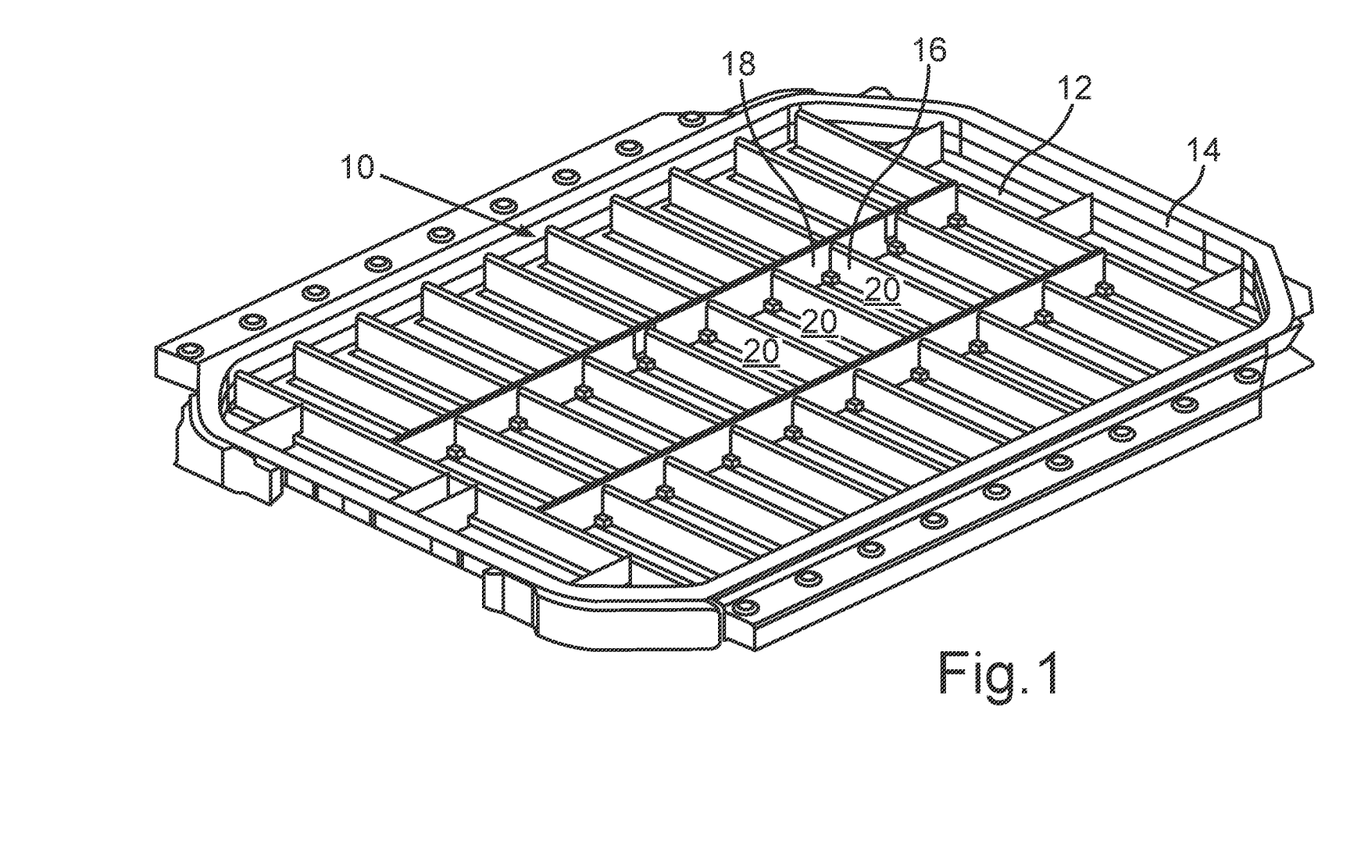
FIG. 1 shows a perspective view of a pan-shaped bottom part of a battery housing of a battery for a motor vehicle, wherein a plurality of compartments for receiving battery modules are defined by walls disposed on a bottom of the pan.

FIG. 1 shows a trough-shaped flat pan 10, which forms a bottom part of a battery housing of a battery for a motor vehicle. The pan 10 includes a bottom 12 and a circumferential side wall 14, wherein the bottom 12 and the side wall 14 form partial regions of walls of the battery housing. Other walls 16, 18, which form a plurality of compartments 20, are disposed on the bottom 12. Respective battery modules 22 are disposed in the compartments 20 (see FIG. 2).

Figure 2:
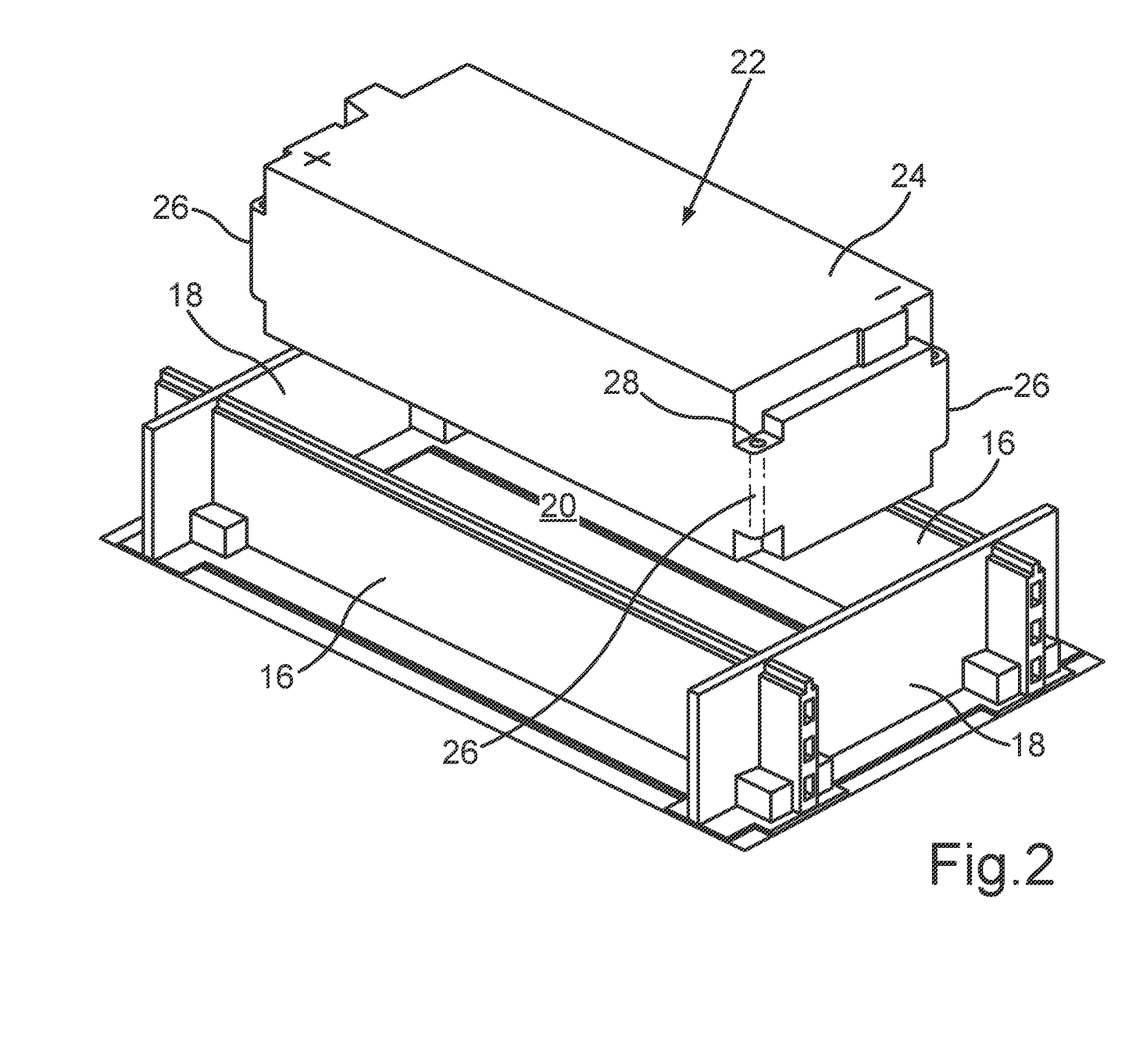
FIG. 2 shows a perspective view of one of the compartments and a battery module to be disposed in the compartment.

FIG. 2 shows an example of a battery module 22. The respective battery module 22 has a module housing 24, in which a plurality of battery cells are disposed. The battery cells not shown in detail herein are electrically interconnected. Accordingly, the respective battery module 22 provides a greater electric voltage and/or electric current than a single battery cell can. In the battery, a plurality of such battery modules 22 are preferably electrically connected in series and/or in parallel by interconnecting module ports of the battery modules 22. In this manner, a battery configured as a high-voltage battery can be provided for the motor vehicle, for example.

The pan 10 shown as an example in FIG. 1 herein comprises compartments 20 for 31 battery modules 22. In variants of the battery, more or fewer battery modules 22 may be disposed in the respective compartments 20.

Figure 3:
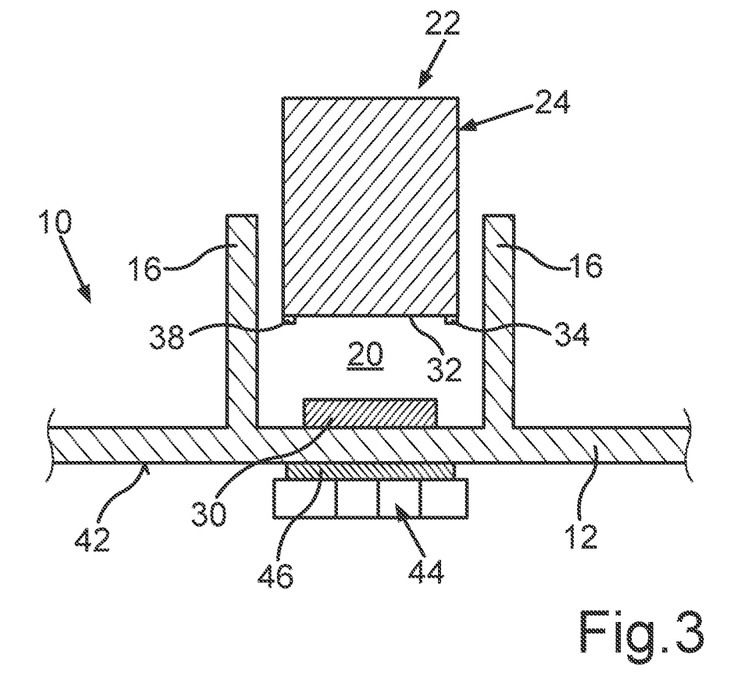
FIG. 3 shows a schematic sectional view of disposing the battery module according to FIG. 2 in the compartment according to FIG. 2, wherein a gap filler is shown, which fills an intermediate space between the bottom of the battery module and the bottom of the compartment when the battery module is installed in the compartment.

FIG. 3 is to illustrate the cooling of the battery modules 22. The substantially cuboid battery module 22 has receptacles 26 for screws in its four corner regions (see FIG. 2). The screws, which are inserted through the receptacles 26, are used to fasten the battery module 22 to the bottom 12 of the pan 10. Respective screw holes 28 formed in the receptacles 26 of the battery module 22 are particularly visible in FIG. 4.

Figure 5:
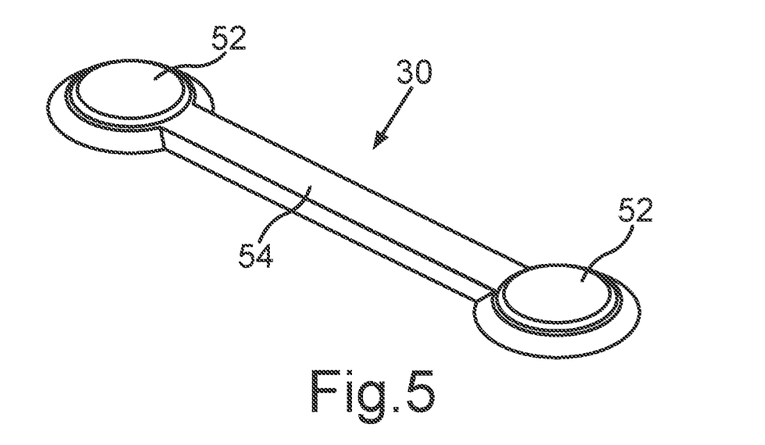
FIG. 5 shows a perspective view of the gap filler, which is disposed in the respective compartment, before the gap filler is flattened.

When fastening the battery module 22 to the bottom 12 of the pan 10, a gap filler 30 is flattened which previously was applied onto the bottom 12 of the pan 10 in the respective compartment 20. A perspective view of the gap filler 30 in its unflattened form is shown in FIG. 5. Accordingly, the gap filler 30 is applied onto the bottom 12, preferably as a dumbbell-shaped bead.

The gap filler 30 located in an intermediate space between the bottom 12 of the pan 10 and a bottom 32 of the module housing 24 is displaced in the radial direction when the battery module 22 is fastened to the bottom 12. It must be ensured in this process that the bottom 32 of the battery module 22, that is, the bottom-side wall of the module housing 24, is wetted as completely as possible with the gap filler 30. The gap filler 30 is a heat conductive paste, particularly a plastic material, which has an increased heat conductivity because of adding additives such as particles of aluminum oxide. Complete wetting of the bottom 32 of the battery module 22 can be achieved by applying considerably more gap filler 30 onto the bottom 12 of the pan 10 than is required for filling the intermediate space or gap between the bottom 32 and the bottom 12. But then quite much of the gap filler 30 exits radially into the compartment 20. This results in wasting gap filler 30 and an increased weight of the battery.

Figure 4:
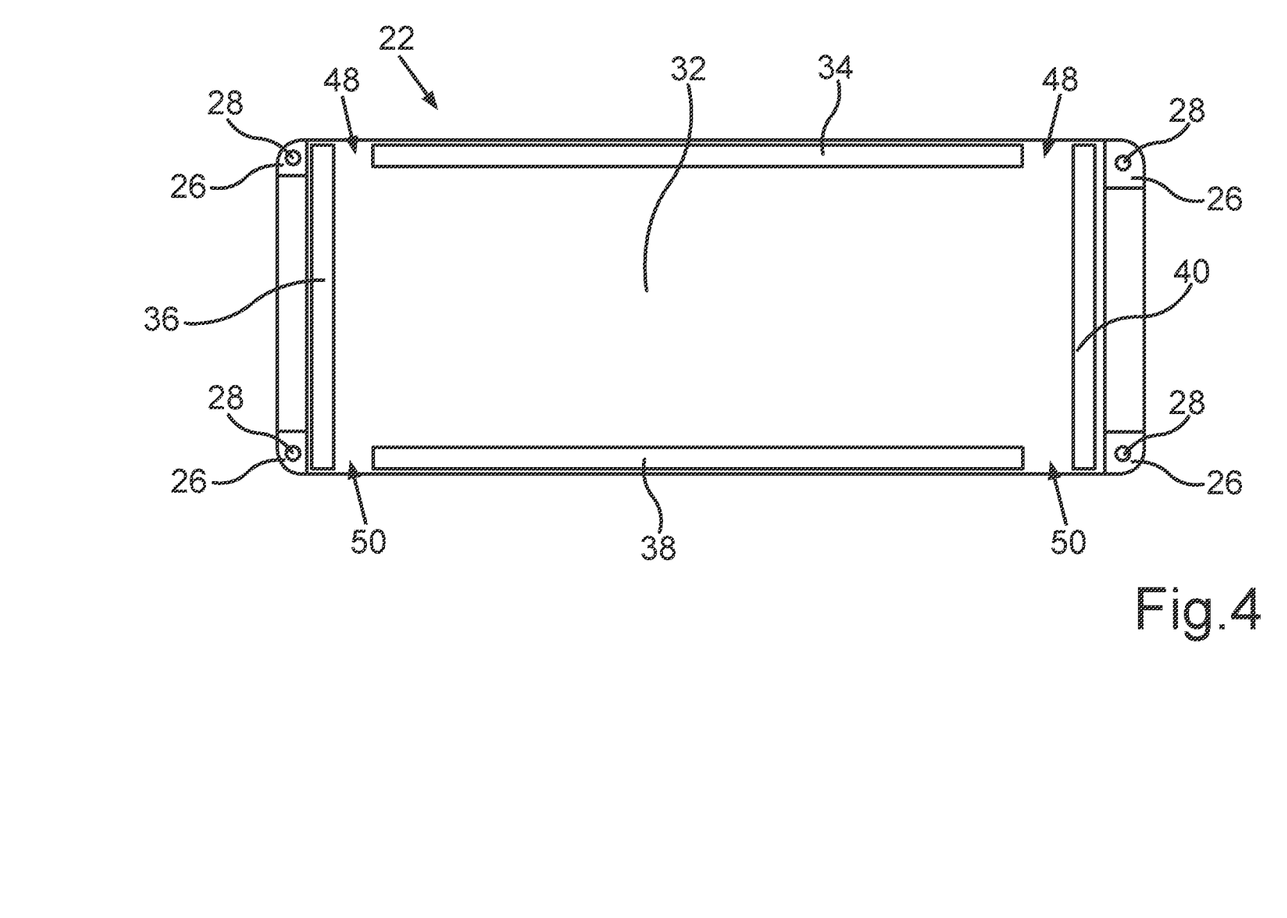
FIG. 4 shows a plan view of the bottom of the battery module, wherein limiting members used as flow blockers are glued to edges of the bottom.

Therefore, limiting members 34, 36, 38, 40 which are used as flow blockers are disposed herein on the bottom 32 of the battery module 22 (see FIG. 4). These limiting members 34, 36, 38, 40 define the intermediate space between the bottom 12 of the battery housing and the bottom 32 of the battery module 22 in the radial direction. FIG. 3 only shows the two limiting members 34, 38, which are fastened to two of the edges of the battery module 22, particularly glued on in the region of the edges. A cooling means 44 which comprises a plurality of cooling ducts through which a cooling medium such as a liquid can flow is disposed underneath the bottom 12, that is, on a side 42 of the bottom 12 facing away from the battery module 22. The cooling means 44 may particularly be fastened to the bottom 12 using a preferably heat conductive adhesive 46.

It is particularly apparent from FIG. 4 that the bottom 32 of the module housing 24 may have the shape of a rectangle. The two limiting members 34, 38 are disposed on the long sides of the rectangle and the two limiting members 36, 40 are disposed on the short sides of the rectangle. Respective passages 48 or exit sites for the gap filler 30 are provided between limiting member 34 and limiting members 36, 40. In other words, a (very small) portion of the gap filler 30 can exit from the intermediate space between the bottom 32 of the battery module 22 and the bottom 12 of the pan 10 via the passages 48.

Likewise, further passages 50 are provided between the limiting member 38 and limiting members 36, 40. These passages 48, 50 define exit sites for the gap filler 30, which can be used for level monitoring. If gap filler 30 exits from both the passages 48 and the passages 50, this means that the intermediate space between the bottom 32 and the bottom 12 is completely filled with the gap filler 30. Disposing the passages 48, 50 in the corner regions of the battery module 22 ensures that the displaced or flowing gap filler 30 reaches these passages 48, 50 or openings last. This guarantees the filling of the intermediate space between the bottom 32 and the bottom 12 without air inclusions.

The limiting members 34, 36, 38, 40, which serve as flow blockers and are preferably straight in shape, are preferably formed of a flexible or compressible and breathable or air permeable material. For example, the limiting members 34, 36, 38, 40 may be formed of a coarse-pored, open-pored foam material. As the battery module 22 nears the bottom 12 of the respective compartment 20, the limiting members 34, 36, 38, 40 are increasingly compressed. In the compressed state, the limiting members 34, 36, 38, 40 ensure setting of a predetermined height of the intermediate space between the bottom 32 of the battery module 22 and bottom 12 of the pan 10.

FIG. 5 shows the gap filler 30 in its form applied to the bottom 12 of the respective chamber or compartment 20, but not yet flattened. Accordingly, the end regions 52 of the gap filler 30 are larger in area and round in shape herein, while a central region 54 connecting the end regions 52 is formed as a strip. This shape, reminiscent of a dumbbell, of the gap filler 30 inserted into the compartment 20 allows application to the bottom 12 in a short process time. The greater amount of gap filler 30 in the end regions 52 takes into account that flowing apart or spreading of the gap filler 30 to all sides occurs at these sites when the gap filler 30 is radially displaced. The strip-shaped central region 54, on the contrary, just widens towards the two sides when the gap filler 30 is flattened.

Since the limiting members 34, 36, 38, 40 are provided, application herein of the gap filler 30 is independent of the shape or any warping of the bottom 12 of the battery housing or the compartments 20, respectively, i.e. allowing compartment-unspecific application in the form of a (preferably dumbbell-shaped) bead.

Figure 6:
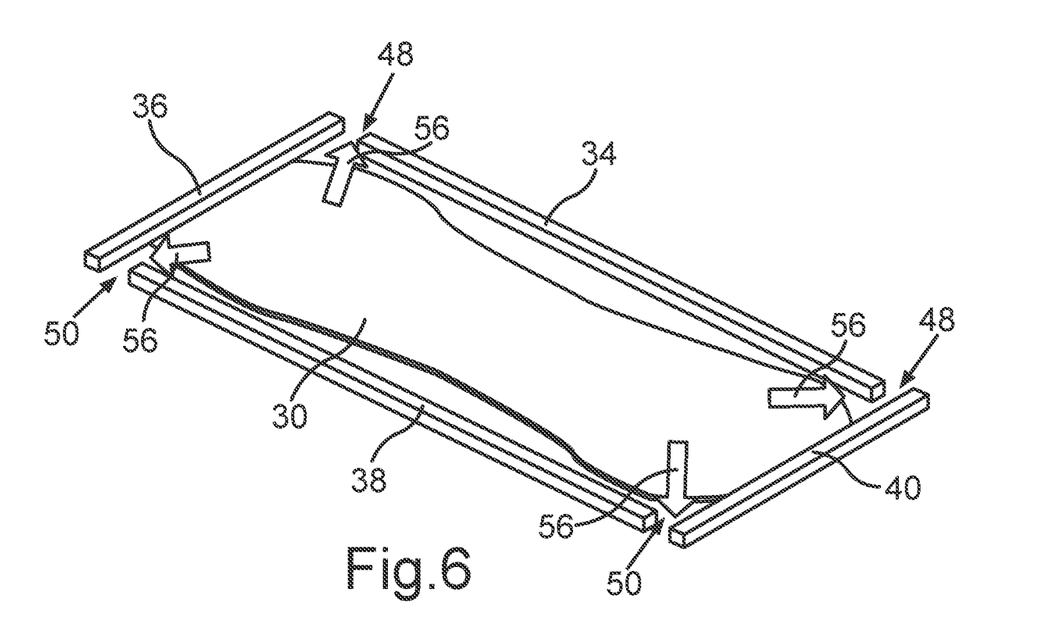
FIG. 6 is a schematic view of the situation of the gap filler flowing towards the limiting members or flow blockers, which gap filler is about to completely fill the intermediate space between the bottom of the battery module and the bottom of the compartment.

FIG. 6 illustrates the flowing or displacement of the gap filler 30. Arrows 56 indicate a flow direction towards the passages 48, 50 while the gap filler 30 spreads. As soon as gap filler 30 exits from the passages 48, 50, the entire intermediate space between the bottom 32 of the battery module 22 and the bottom 12 of the pan 10 (see FIG. 3) as defined radially and on its edges by the limiting members 34, 36, 38, 40 is filled with the gap filler 30.

The example overall illustrates how the invention can provide a pan 10 or battery pan, particularly for a battery of an electric vehicle, in which the gap filler 30 ensures good heat conduction.

The invention claimed is:

1. A battery for a motor vehicle, having at least one battery module which comprises:
    a plurality of battery cells, and a battery housing in which the at least one battery module is disposed,
    wherein a gap filler is disposed in an intermediate space between a wall of the battery housing and a bottom face of a module housing of the battery module,
    wherein the intermediate space is limited at least towards one side by at least one limiting member, which is spaced apart from at least one other wall adjacent to the wall of the battery housing,
    wherein the filler material is designed as a paste which can be laterally displaced due to disposing the battery module at the battery housing,
    wherein the gap filler completely fills the intermediate space and thus contacts the wall of the battery housing, the bottom face of the module housing, and the at least one limiting member,
    wherein the at least one limiting member is fastened to the bottom face of the module housing and does not protrude beyond an edge of the bottom face,
    wherein the at least one limiting member is formed of an air permeable material,
    wherein a passage which allows a part of the filler material to exit the intermediate space is formed between at least two limiting members, and
    wherein the bottom face of the module housing is shaped as a rectangle, wherein the respective passages are formed between limiting members disposed on long sides of the rectangle and limiting members disposed on short sides of the rectangle.

2. The battery according to claim 1, wherein the intermediate space is circumferentially limited by the at least one limiting member.

3. The battery according to claim 1, wherein the at least one limiting member is fastened along the edge of the bottom face of the module housing.

4. The battery according to claim 1, wherein the at least one limiting member is formed of a compressible material.

5. The battery according to claim 4, wherein the at least one limiting member has a greater height in an initial state than in an installed state, in which the battery module is fastened to the battery housing.

6. The battery according to claim 1, wherein a cooling means through which a cooling medium can flow is disposed on a side of the wall of the battery housing facing away from the battery module.

7. The battery according to claim 1, wherein the battery comprises a plurality of the battery modules, wherein the wall of the battery housing is formed as bottom of the battery housing, wherein compartments in which the battery modules are accommodated are formed by a plurality of the other walls adjacent to the bottom of the battery housing and spaced apart from the at least one limiting member.

8. The battery according to claim 1, wherein the gap filler includes a plastic material and at least one additive, which has a higher heat conductivity than the plastic material.

9. The battery according to claim 3, wherein the gap filler includes a plastic material and at least one additive, which has a higher heat conductivity than the plastic material and/or a cooling means through which a cooling medium can flow is disposed on a side of the wall of the battery housing facing away from the battery module.

* * * * *